United States Patent
Woodland et al.

(10) Patent No.: US 10,577,073 B2
(45) Date of Patent: *Mar. 3, 2020

(54) AIRCRAFT BASED NON-DEDICATED SPECIAL MISSION POD MOUNTING APPARATUS

(71) Applicant: 1281329 Alberta Ltd., Calgary (CA)

(72) Inventors: Richard L. K. Woodland, Homosassa, FL (US); Ross James Neyedly, Calgary (CA)

(73) Assignee: 1281329 Alberta Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,368

(22) Filed: Sep. 20, 2018

(65) Prior Publication Data

US 2019/0023370 A1   Jan. 24, 2019

Related U.S. Application Data

(63) Continuation of application No. 15/692,903, filed on Aug. 31, 2017, now Pat. No. 10,106,239, which is a continuation of application No. 15/265,681, filed on Sep. 14, 2016, now Pat. No. 9,751,611, which is a continuation of application No. 14/150,710, filed on
(Continued)

(51) Int. Cl.
| | | |
|---|---|---|
| *B64C 1/14* | (2006.01) |
| *B64C 1/36* | (2006.01) |
| *B64D 47/08* | (2006.01) |
| *B64D 7/00* | (2006.01) |

(52) U.S. Cl.
CPC .............. *B64C 1/1461* (2013.01); *B64C 1/36* (2013.01); *B64D 7/00* (2013.01); *B64D 47/08* (2013.01)

(58) Field of Classification Search
CPC .......... B64D 9/003; B64D 7/00; B64D 43/00; B64D 11/0696; B64D 11/06; B64D 1/02; B64D 25/12; B64C 1/18; B64C 1/20; B64C 1/22; B64C 1/1407; B64C 1/1461; B64C 1/36; B64C 39/02; B64C 7/00
See application file for complete search history.

(56) References Cited

U.S. PATENT DOCUMENTS 2,441,181 A  *  5/1948  Bartelheim ............ H01H 11/04
                                                                  29/432
2,441,183 A  *  5/1948  Bludworth .................... 560/100
(Continued)

FOREIGN PATENT DOCUMENTS

| | | | | |
|---|---|---|---|---|
| CH | 664333 A5 * | 2/1988 | ............... | B64C 1/06 |
| EP | 0191610 A1 * | 8/1986 | ............ | B64D 11/00 |

(Continued)

*Primary Examiner* — Benjamin P Lee
(74) *Attorney, Agent, or Firm* — Baker Botts L.L.P.

(57) ABSTRACT

In particular embodiments, a mission payload mounting apparatus comprises a pressurized door plug assembly on a side of an aircraft fuselage and a strut having a first end and a second end. The strut extends from an interior of the aircraft fuselage through the pressurized door plug assembly to an exterior of the aircraft fuselage. The strut is capable of being rotationally actuated about an axis exterior to the aircraft fuselage. The first end of the strut is connected to the interior of the aircraft fuselage. One or more payloads are attached to the strut between the axis and the second end.

20 Claims, 10 Drawing Sheets

Related U.S. Application Data

Jan. 8, 2014, now Pat. No. 9,452,834, which is a continuation of application No. 12/734,159, filed as application No. PCT/US2008/011766 on Oct. 15, 2008, now Pat. No. 8,657,230.

(60) Provisional application No. 60/999,316, filed on Oct. 17, 2007.

(56) References Cited

U.S. PATENT DOCUMENTS

| | | | | |
|---|---|---|---|---|
| 2,441,295 | A * | 5/1948 | Cantrell | C07F 9/11 558/114 |
| 2,441,374 | A * | 5/1948 | Robb | D03D 39/02 139/2 |
| 3,520,581 | A * | 7/1970 | Borghi | F25D 23/064 312/236 |
| 3,666,214 | A * | 5/1972 | Matuska | B64D 11/003 16/82 |
| 3,823,901 | A * | 7/1974 | Holmes | B64D 1/02 244/118.1 |
| 4,044,364 | A * | 8/1977 | Prinzo | F16M 11/10 348/373 |
| 4,078,107 | A * | 3/1978 | Bitterice | B32B 17/10018 428/38 |
| 4,114,839 | A * | 9/1978 | Sibley | B64D 47/08 244/118.1 |
| 4,154,416 | A * | 5/1979 | Bruce | B64C 1/1407 114/66 |
| 4,162,776 | A * | 7/1979 | Sibley | B64D 47/08 244/118.1 |
| 4,588,147 | A * | 5/1986 | Lindsey, Jr. | B64C 7/00 244/118.1 |
| 4,746,082 | A * | 5/1988 | Syms | B64D 47/08 244/118.2 |
| 5,191,370 | A * | 3/1993 | Bozzolato | B64D 47/08 396/13 |
| 5,473,125 | A * | 12/1995 | Stief | B60R 13/0815 181/286 |
| 5,496,989 | A * | 3/1996 | Bradford | B60S 1/026 219/482 |
| 5,517,895 | A * | 5/1996 | Sanderson | B64C 1/18 244/118.1 |
| 5,868,355 | A * | 2/1999 | Carter, Jr. | B63B 19/08 114/117 |
| 5,927,648 | A * | 7/1999 | Woodland | B64D 7/00 244/118.1 |
| 6,056,237 | A * | 5/2000 | Woodland | B64C 3/40 244/3.15 |
| 6,564,690 | B1 * | 5/2003 | Long | B64D 7/06 224/181 |
| 6,616,097 | B2 * | 9/2003 | Hilbert | B64C 1/20 244/118.1 |
| 6,802,239 | B1 * | 10/2004 | Sanderson | B64D 7/06 244/3.16 |
| 6,886,773 | B2 * | 5/2005 | Peckham | B64D 3/02 244/1 TD |
| 6,929,214 | B2 * | 8/2005 | Ackleson | B64D 7/00 244/1 R |
| 7,011,273 | B1 * | 3/2006 | Stanford | B60N 3/102 224/275 |
| 7,387,276 | B1 * | 6/2008 | Smith | B64C 1/1 244/1 R |
| 7,610,841 | B2 * | 11/2009 | Padan | B64D 1/04 244/118.1 |
| 7,765,912 | B1 * | 8/2010 | Serkland | F41A 23/00 224/401 |
| 8,151,539 | B2 * | 4/2012 | Grinsted | E04C 2/205 52/220.2 |
| 8,448,561 | B2 * | 5/2013 | Carroll, III | F41A 23/12 248/125.8 |
| 9,428,273 | B1 * | 8/2016 | Serkland | B64D 7/06 |
| 9,617,008 | B2 * | 4/2017 | Goto | B61D 49/00 |
| 2005/0029398 | A1 * | 2/2005 | Lowe | B64D 47/08 244/118.1 |
| 2005/0029399 | A1 * | 2/2005 | Lowe | B64D 47/08 244/118.1 |
| 2006/0284011 | A1 * | 12/2006 | Pasty | B65D 88/14 244/118.1 |
| 2008/0047421 | A1 * | 2/2008 | Carroll, III | F41A 23/12 89/38 |
| 2010/0206988 | A1 * | 8/2010 | Woodland | B64C 1/1407 244/129.5 |

FOREIGN PATENT DOCUMENTS

| | | | |
|---|---|---|---|
| EP | 1614623 A1 * | 1/2006 | B64C 1/1492 |
| WO | WO-9816421 A1 * | 4/1998 | B64C 1/1415 |
| WO | WO-2009061347 A1 * | 5/2009 | B64C 1/20 |

* cited by examiner

AIRCRAFT BASED NON-DEDICATED SPECIAL MISSION POD MOUNTING APPARATUS

PRIORITY

This application is a continuation under 35 U.S.C. § 120 of U.S. patent application Ser. No. 15/692,903, filed Aug. 31, 2017, issued as U.S. Pat. No. 10,106,239, which is a continuation under 35 U.S.C. § 120 of U.S. patent application Ser. No. 15/265,681, filed 14 Sep. 2016, issued as U.S. Pat. No. 9,751,611, which is a continuation under 35 U.S.C. § 120 of U.S. patent application Ser. No. 14/150,710, filed 8 Jan. 2014, issued as U.S. Pat. No. 9,452,834, which is a continuation under 35 U.S.C. § 120 of U.S. patent application Ser. No. 12/734,159, filed 14 Apr. 2010, issued as U.S. Pat. No. 8,657,230. This application also claims the benefit under 35 U.S.C. § 265(c) of International Patent Application No. PCT/US08/11766, filed 15 Oct. 2008, which claims the benefit under 35 U.S.C. § 119(e) of U.S. Provisional Application No. 60/999,316, filed 17 Oct. 2007, each of which is incorporated herein by reference.

FIELD OF THE INVENTION

This invention relates to a temporarily mounted, portable, modular, aircraft-based special mission mounting system which does not require airframe modifications to accommodate the external carriage of unique airborne hardware suites, such as, for example: Command, Control, Communications, Computer, Intelligence, Surveillance, and Reconnaissance ($C^4ISR$) sensing, detection, targeting, tracking, communications relay, unmanned vehicle telemetry, aircraft self defense pods, or jettisonable stores.

BACKGROUND OF THE INVENTION

Aircraft-based platforms are ideally suited for time-sensitive emergency, as well as routine, sensing or other electronic based search, monitoring, surveillance and response activities. For example, numerous civilian- and military-based aircraft response agencies require high resolution aerial thermal (IR), radar, ultra violet (UV), photographic, multi-spectral, hyperspectral or other sensor imagery in a timely manner. Similarly, such agencies may also require electronics intelligence (ELINT) data, communications relay, communications intelligence (COMINT) data, signals intelligence (SIGINT) data, communications jamming, satellite communications (SATCOM), satellite telemetry, electronic support measures (ESM), electronics countermeasures (ECM), anti-submarine warfare (ASW), magnetic anomaly detection (MAD), missile counter measures (MCM) pods, or other types of electronic or image sensing information pods in a timely fashion to formulate a given response.

Existing aircraft mounting methodologies for these or related $C^4ISR$ electronics and sensors are typically packaged in systems dedicated to a specific aircraft, or partially dedicated in as much that a given system can be mounted within a pod which can be moved between aircraft but still necessitates air frame modifications to accommodate wing or belly mounting pylons typical of the USAF RC-12.

As an alternative, an aircraft door compatible temporary mounting system is described in U.S. Pat. No. 5,927,648, entitled "Aircraft Based Sensing, Detection, Targeting, Communications, and Response Apparatus" issued Jul. 27, 1999 to Richard L. K. Woodland, and incorporated herein by reference. The Woodland invention is able to accommodate mounting on various aircraft without incurring any airframe modifications but is completely reliant on a mounting pallet to absorb flight induced loads which are then transferred from the torque pallet into the aircraft floor structure. The pallet mounted special mission assembly disclosed by Woodland when used in conjunction with rear loading/jettisoning cargo aircraft like a Lockheed Martin C-130 also compromises all other backend air drop operations which require use of the air deployment system (ADS) rails.

Accordingly there is an on-going, unaddressed need to achieve a flexible, rapidly-installed, roll-on, cost-effective, airborne $C^4ISR$ and special mission strut and pod mounting methodology.

Further, there is a need for such a strut and pod that permits a 360-degree field of view (FOV).

Further, there is a need for such a strut and pod that does not interfere with backend cargo air drop operations.

Still further, there is a need for such a strut and pod that provides in-flight extension and retraction of the strut and payload assemblies into the fuselage for reloading or changing sensor configurations, and provides an alternate load transfer path for externally-mounted payload systems into the primary aircraft structure without using a pallet or necessitating modifications to the host aircraft.

SUMMARY OF THE INVENTION

The apparatus and system of the present invention solves the problem of temporarily mounting aircraft based special mission payload systems without compromising air drop operations by utilizing a rapidly-installed Adaptive Mounting Plate (AMP) and load transfer brace assembly which interfaces with the host aircraft's Air Deployment System (ADS) rails, or conversely with an Adaptive ADS rail section when ADS rails are not resident on the aircraft. The specially contoured AMP is to provide precision fitment to the ADS Rail section which is generally achieved by means of cargo tie down rings which protrude through the AMP and are tensioned in place by adjustable cam lock means familiar to those skilled in the art of cargo handling systems. Other restraints means are also employed by way of bolts which connect the AMP to the ADS rails, and in turn the ADS rails to the host aircraft floor. Other alternative methodologies disclosed but not necessarily deemed advantageous include removing the cargo tie down bolts and interfacing the AMP directly to the bolt sockets using custom fitted bolts. Typically the AMP is machine milled to a specific contoured shape which reflects the bolt patterns, compatible metallurgy, and operability mechanisms of the specific rail section it is to be mounted to. For example ADS rail sections five or six adjacent the paratroop doors of a Lockheed Martin C-130 aircraft are different from those of an Alenia C-27J, yet the mounting methodology and load transfer path are identical as employed in the current invention. The AMPs for each aircraft may appear different but the connection, fastening, and load transfer methodologies are identical. The AMP is also typically milled from a single block of non-ferrous aerospace metal which accommodates restraint and bolt devices and unique positioning of the same along the top and sides of the ADS rail. The AMP is effectively engineered to the adequate thickness to provide for the transfer of in-flight dynamic torque, lateral and other loads exerted upon the various mission payload pods and then transferred through the strut to the interior ADS rail, Load Transfer Brace (LTB) and associated cargo tie down "D" ring locations thereby precluding the requirement for a loads transfer (torque) pallet, or dedicated airframe modifications which interfere with aircraft backend operations. Although the embodiment of the present invention is optimized through use of a standard ADS rail section, a substitute or modified rail section can be used which interfaces to the host aircraft floor by matching the floor's unique cargo tie down bolt pattern and creating an interface directly to the floor upon which the AMP and LTBs can be attached.

The preferred embodiment of the present invention utilizes an electrically-actuated strut which is attached to the AMP and installed through a fuselage side door orifice. The system apparatus as described herein is equipped with a NATO standard ordinance rack to accommodate the paid mounting and release of a variety of mission pods or stores which are suspended external of the host airframe. Said actuated strut also incorporates a redundant manual retraction and extension drive assembly, which is independent of the electrical drive system. Once in flight the strut can be articulated to a position below the lower periphery of the host aircraft fuselage to achieve a 360-degree FOV for unobstructed electro-optical, radar, RF or other sensor coverage, or can be used to jettison stores. The actuated strut can also be extended from the aircraft interior or retracted inboard back into the cargo bay while in flight for the purpose of maintaining mission security, reloading stores, changing sensors or other mission packages affixed to the end of the strut.

A second variant of the preferred embodiment of the present invention incorporates a non-actuated strut attached to the AMP which is of variable length and angle in the X, Y, or Z axis which also transits under an indent of a door plug mounted within an open doorway to position a payload external of the aircraft in a predetermined position which remains static throughout the flight and does not require a 360-degree FOV.

For heavier payloads which require a diverse load transfer path into the cargo floor of the host aircraft, the preferred apparatus of the AMP is equipped with a plurality of articulated and in-flight removable Load Transfer Braces (LTB) which extend inboard from the AMP which in turn distributes the loads over a Floor Loads Plate (FLP) which is mechanically attached to at least a plurality of cargo floor tie down rings using adjustable cargo cam lock means.

Once the strut, AMP, and load transfer system are installed, the preferred embodiment incorporates a temporary, one- or two-piece segmented pressurized door plug with a non-dedicated door retraction system which is fully operable in flight. In either of the one- or two-piece versions, the door plugs are indented about the lower periphery to accommodate the protrusion of the strut into the door panel in such a way as to provide a pressurized seal about the strut when the door plug is closed.

The integrated system of the embodiment of the present invention also incorporates connectivity to and utilization of on-board workstations, aircraft positional data, communications systems, data processing systems, stores or other mission equipment linked to mounting and employment of the fixed position or articulated strut described herein. Further, the complete system of the present invention utilizes various iron lung, litter, missile, winch, auxiliary, or other existing electrical power interfaces to drive the various components and mission systems of the present invention on the host aircraft without the need for modifications.

Installation of the completed special mission system strut, AMP, load transfer braces, door plug, and associated assemblies of the present invention are installed in the unique manner described herein to enable use of the ADS rail system, operability of the host door plug, and extension and retraction of the strut while in flight without interfering with the host aircraft's normal performance envelope, emergency egress, air drop, or other back end operations of the host aircraft.

DETAILED DESCRIPTION OF THE INVENTION

The invention is now described in terms of the FIGURES to more fully delineate in detail the scope, materials, components, conditions, and methods associated with the design, and employment of the present invention.

Figure 1:
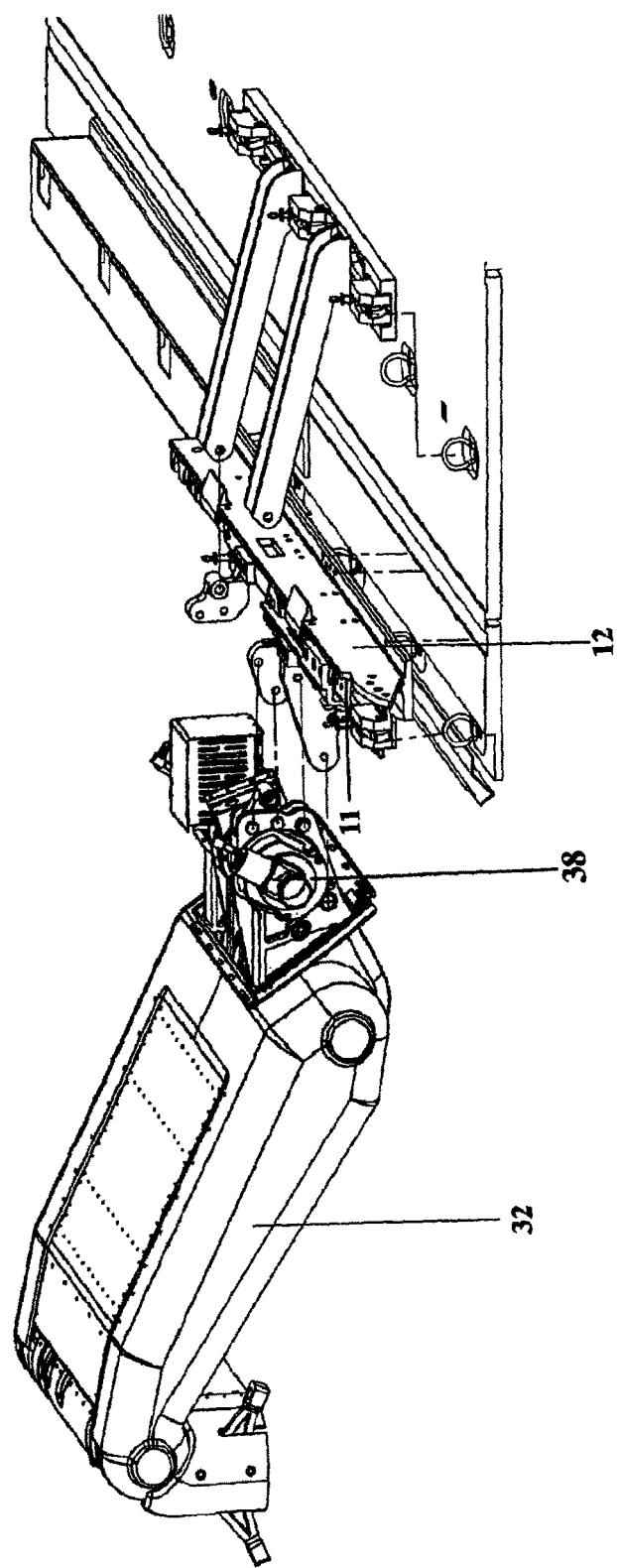
FIG. 1 is an exploded view of the ADS Rail section and AMP with bolt patterns, 20 cam locks, and overall attachment methodologies of all plate angles, holes, and fastening components.
Figure 1A:
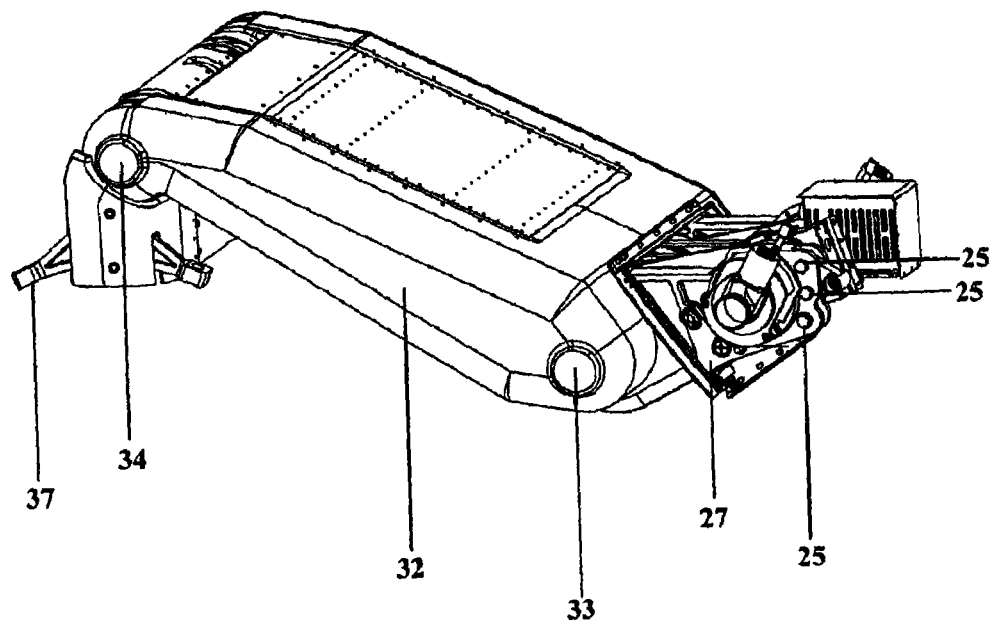
FIG. 1A is an exploded overview of the primary structural and mechanical attachment mechanism of a strut of the present invention including the motor housing bolt assembly, strut motor housing casing, shoulder armature assembly, strut, secondary wrist armature assembly, and adjustable sway braces.
Figure 1B:
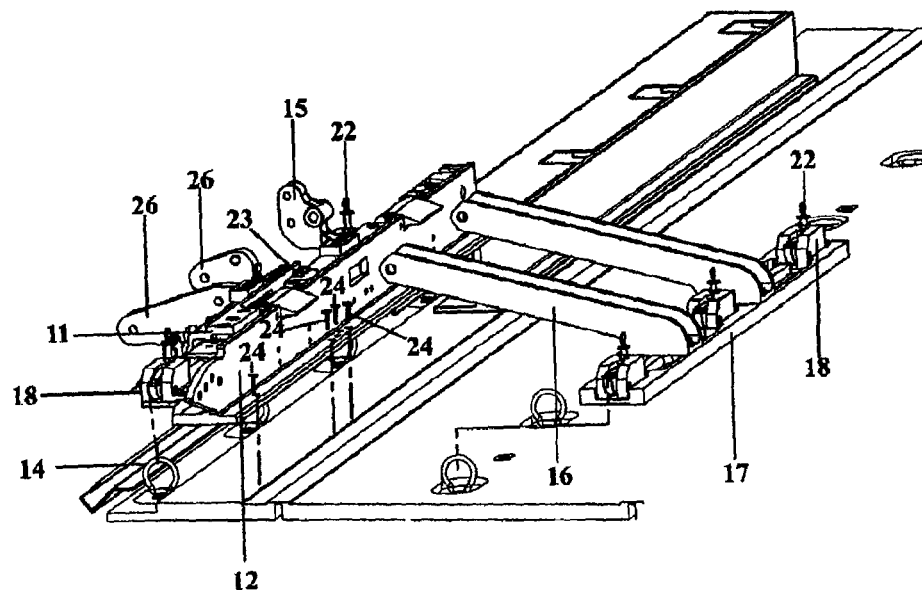
FIG. 1B is an exploded overview of the primary structural and mechanical attachment mechanism of a strut of the present invention including the adaptive mounting plate, adjustable cam locks, cargo tie down "D" rings, ADS rail, load transfer braces, floor load plate, adjustment bolts, load transfer brace flange, AMP restraining bolts, ADS restraining bolts, and AMP motor housing flanges.

FIGS. 1 through 1B depict an exploded overview of the primary structural and mechanical attachment mechanisms of a strut of the present invention assembled as it would normally be connected together and installed to achieve fitment of a pod or other apparatus aboard a Lockheed-Martin C-130 aircraft 1, including one or more adaptive mounting plates (AMP) 11. Adaptive mounting plates 11 can be perforated with bolt holes which interface and otherwise permit connectivity to a standard ADS rail 12, by means of multiple AMP restraint bolts 23 (as shown in FIG. 1B). Once the adaptive mounting plates 11 have been secured to the ADS rail 12, or a section of the ADS rail 12, the rail or section can be positioned and secured to the aircraft floor utilizing multiple ADS restraint bolts 24 and/or cargo tie down "D" rings 14, with adjustable cam locks 18 which can be tensioned by turning the adjustment bolt 22, until the ADS rail 12, section is secure against the aircraft floor. For aircraft not having an ADS rail 12 already installed, those skilled in the art of aircraft component fabrication can install an ADS rail or section that can be made to match the host aircraft cargo floor bolt pattern. In this manner, the present invention can be made to accommodate a variety of airframe types.

Figure 2:
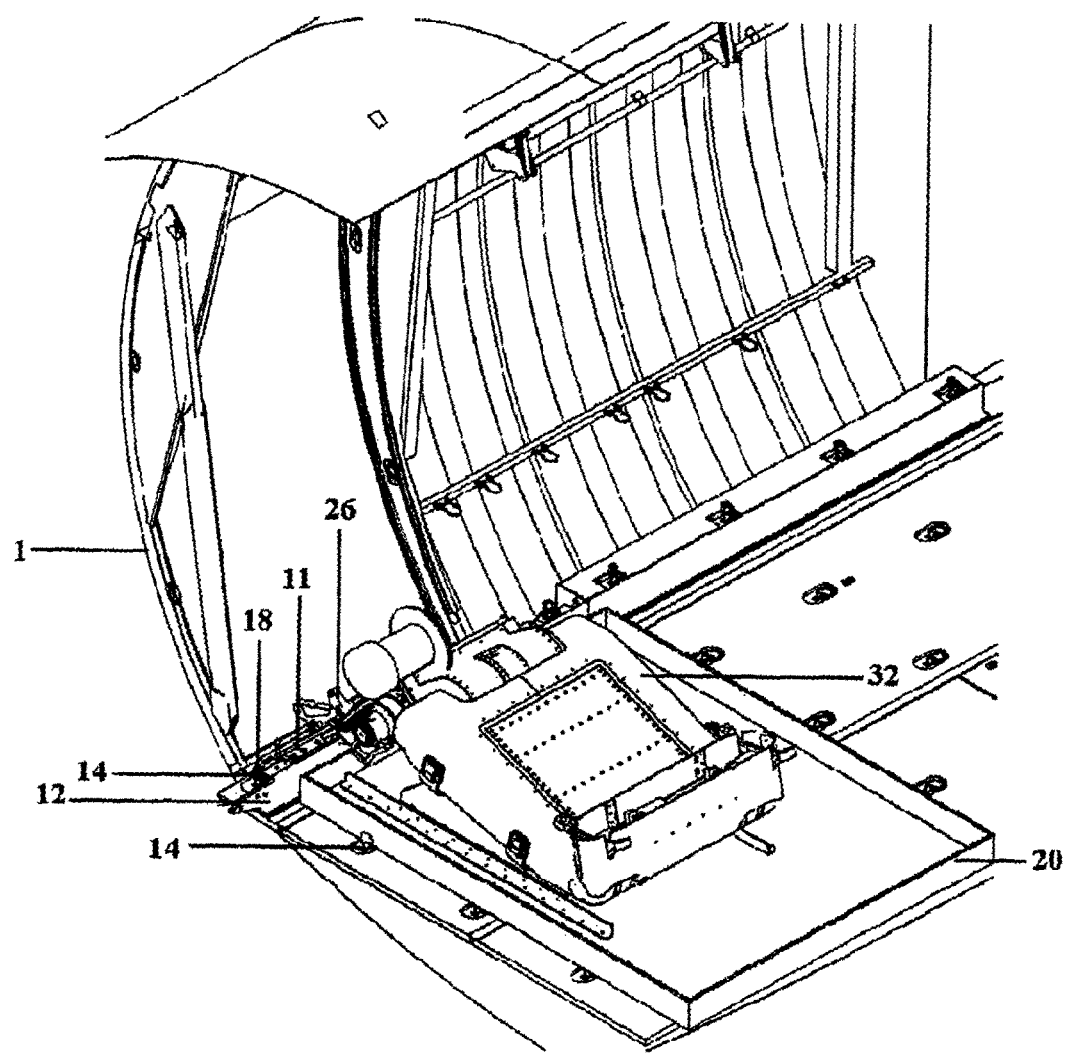
FIG. 2 depicts a rotationally-articulated strut being aligned to the AMP using the lower section of the transport case after the AMP has been attached to the ADS rail.

As depicted in FIG. 2, the current invention can be housed within a modular case or cases so as to facilitate transport and aid in mechanical interface alignment. As shown, the invention can be stored and transported in a strut transport and alignment case 20, a portion of which can be temporarily secured to the aircraft floor when the strut is to be installed. A motor housing bolt assembly 25 (as shown in FIG. 1A) can be been inserted through and secured to an AMP motor housing flange 26, to connect the strut 32, about a shoulder armature assembly 33, with the adaptive mounting plate (AMP) 11. Once the strut 32 is secured to the adaptive mounting plate (AMP) 11, the shoulder armature assembly 33 can be rotated outboard and the strut transport & alignment case 20, disconnected and removed from the host aircraft. The strut is rotationally connected to the aircraft.

Figure 4:
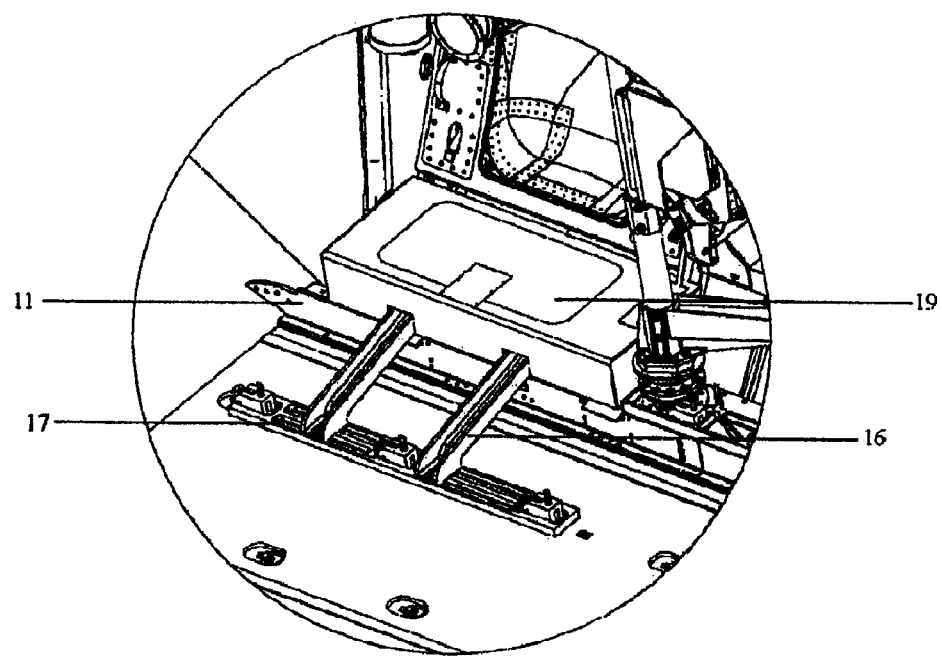
FIG. 4 depicts the completed assembly installed and covered by a removable armored housing.
Figure 5:
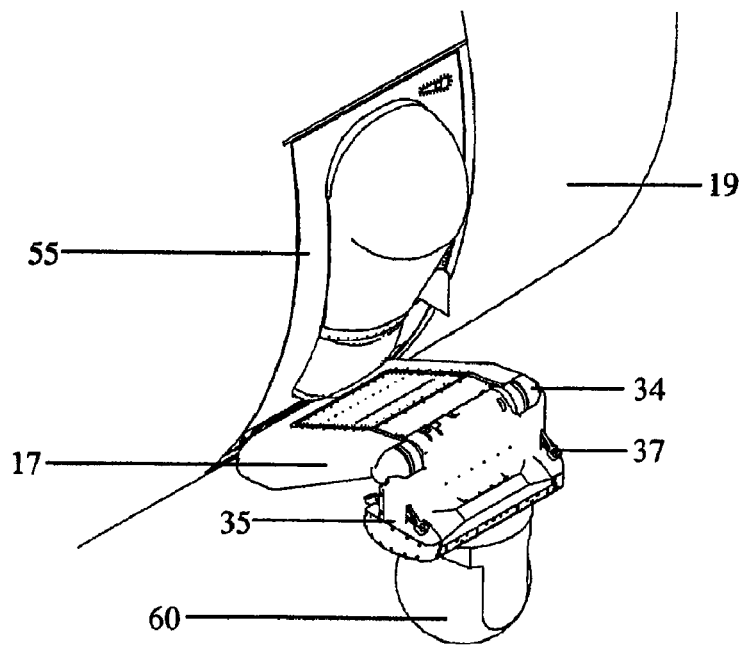
FIG. 5 is an exterior depiction of a strut in the retracted position with a single sensor attached to BRU-12 bomb rack with conformal fairing and sway braces deployed, and an observer bubble window installed within the door plug.

The shoulder armature assembly 33 accommodates the mounting and functional integration of one or more electrical drive motors 38. In one embodiment, two redundant electrical drive motors 38 are each equipped with a brake disengagement handle 39 for use in the event that both drive motor 38 fail. In such a failure the brake disengagement handle 39 can be activated which allows the motors to turn freely thereby permitting a hand actuated speed wrench to be inserted into the manual retraction socket 40, to retract or extend the rotationally-actuated strut 32. As shown in FIG. 4. the entire motor housing and shoulder armature assembly 33, assembly can accommodate an AMP armor housing 19, to protect the manned operator typically located above at a bubble viewing port.

As noted in FIGS. 5, 6, 7, and 9 the apparatus of the present invention also incorporates a secondary wrist armature assembly 34, which is mechanically connected to the shoulder armature assembly 33, by means of a geared rotating linkage that keeps the wrist armature assembly 34 in the vertical position as the rotationally-actuated strut 32, is articulated from a retracted position to a fully extended position exterior of the aircraft. This particular feature does not apply when fully retracting the present invention into the fuselage of the host aircraft. The rotationally-actuated strut 32, can be equipped with a standard NATO ordinance rack 35, with a fourteen inch set of locking lugs which can also be fitted with a pylon slipper to accommodate other ordinance racks including a triple ejector rack 36. Regardless of the ejector rack employed, the payload can be stabilized by lateral, gust, and other wind loads by a pair of adjustable sway braces 37, which can be fitted for a variety of pods and payloads suspended at the end of the rotationally-actuated strut 32. The operator control mechanism for the strut assembly can be located in a handheld device adjacent the door plug or built into the door plug using indicator lights, cabling and switches common to those skilled in aircraft engineering.

Figure 7:
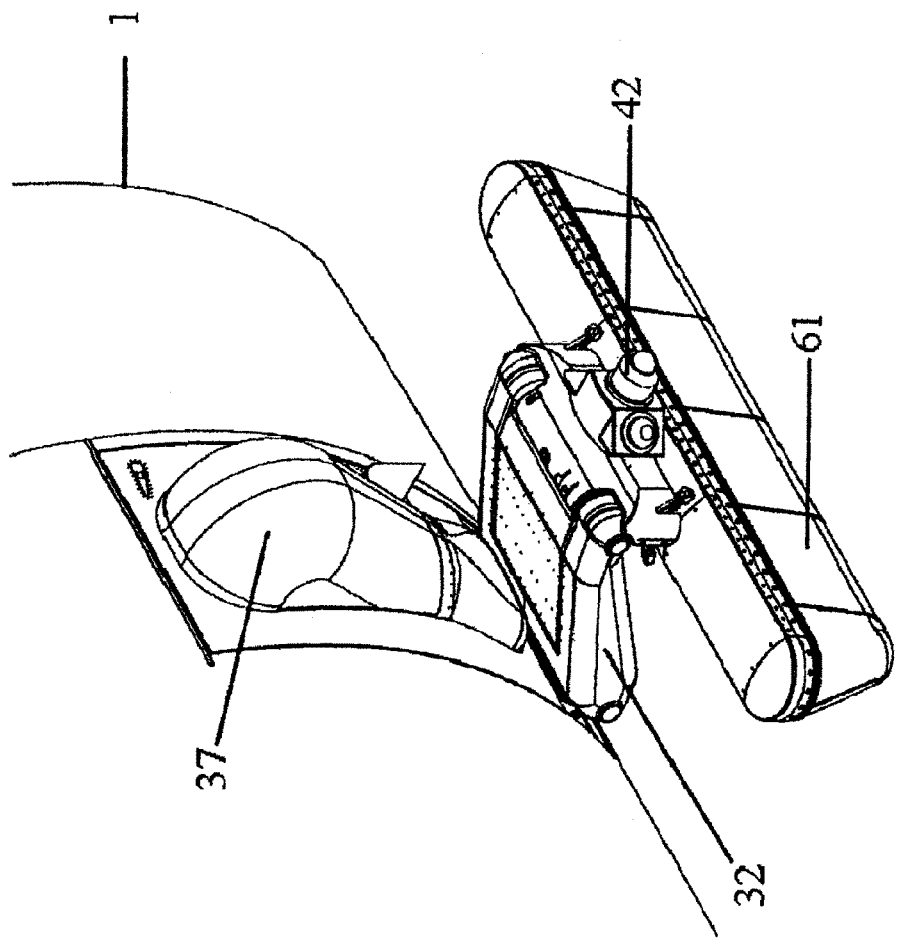
FIG. 7 depicts an exterior view of an articulated strut in the retracted position with an RF communications pod and EWSP missile counter measures fairing mounted outboard of the strut's secondary wrist assembly with a bubble door and sway braces deployed.

As depicted in FIG. 7, the rotationally-actuated strut 32, can also accommodate an Electronic Warfare Self Protection, EWSP fairing assembly 42, attached as a knuckle adjacent the wrist armature assembly 34.

Figure 8:
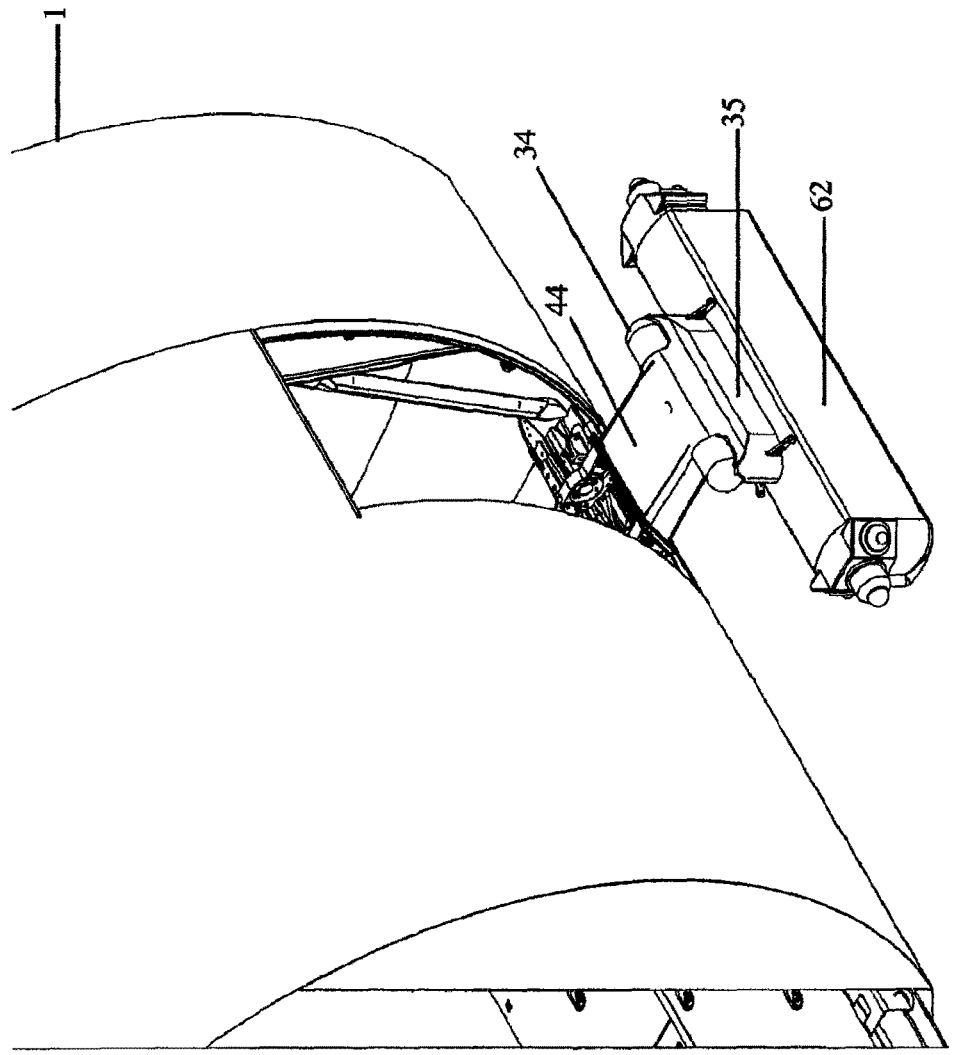
FIG. 8 depicts a non-articulated, fixed position strut with EWSP missile countermeasures pod equipped with IR detection set, laser countermeasures, and an ALE-55 towed decoy.
Figure 9:
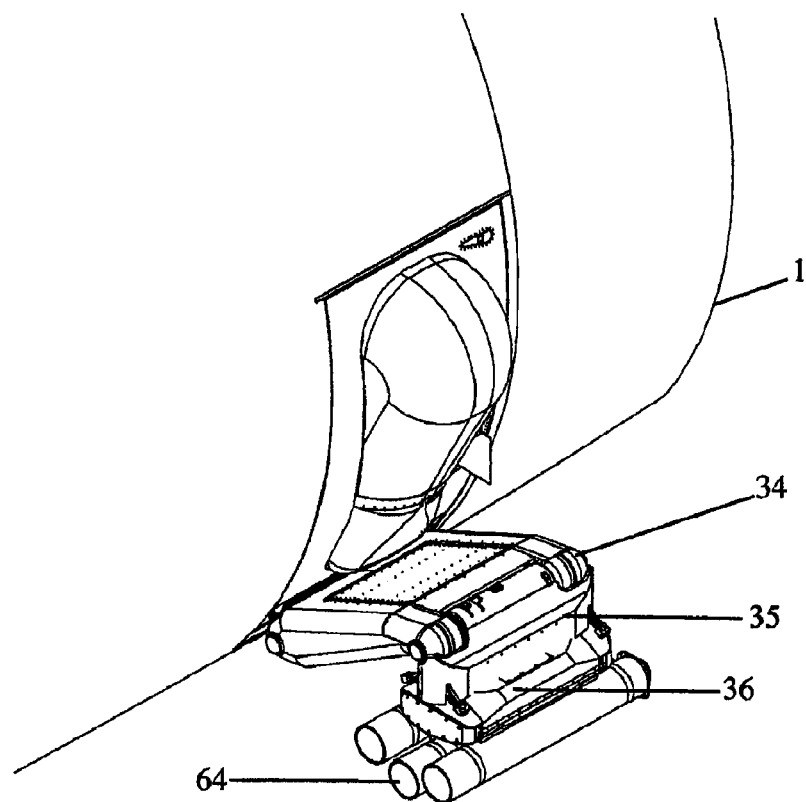
FIG. 9 depicts an articulated strut with a triple ejector rack fitment on the strut's BRU-12 rack carrying three releasable, in-flight re-loadable, doorway form compliant stores.

As depicted in FIG. 8, a non articulated strut 44, can also be mounted to the adaptive mounting plate (AMP) 11. Such a configuration can be utilized when rotation or other motion activation is not required, as in the case of hosting dual EWSP missile countermeasures pod 62.

Figure 3:
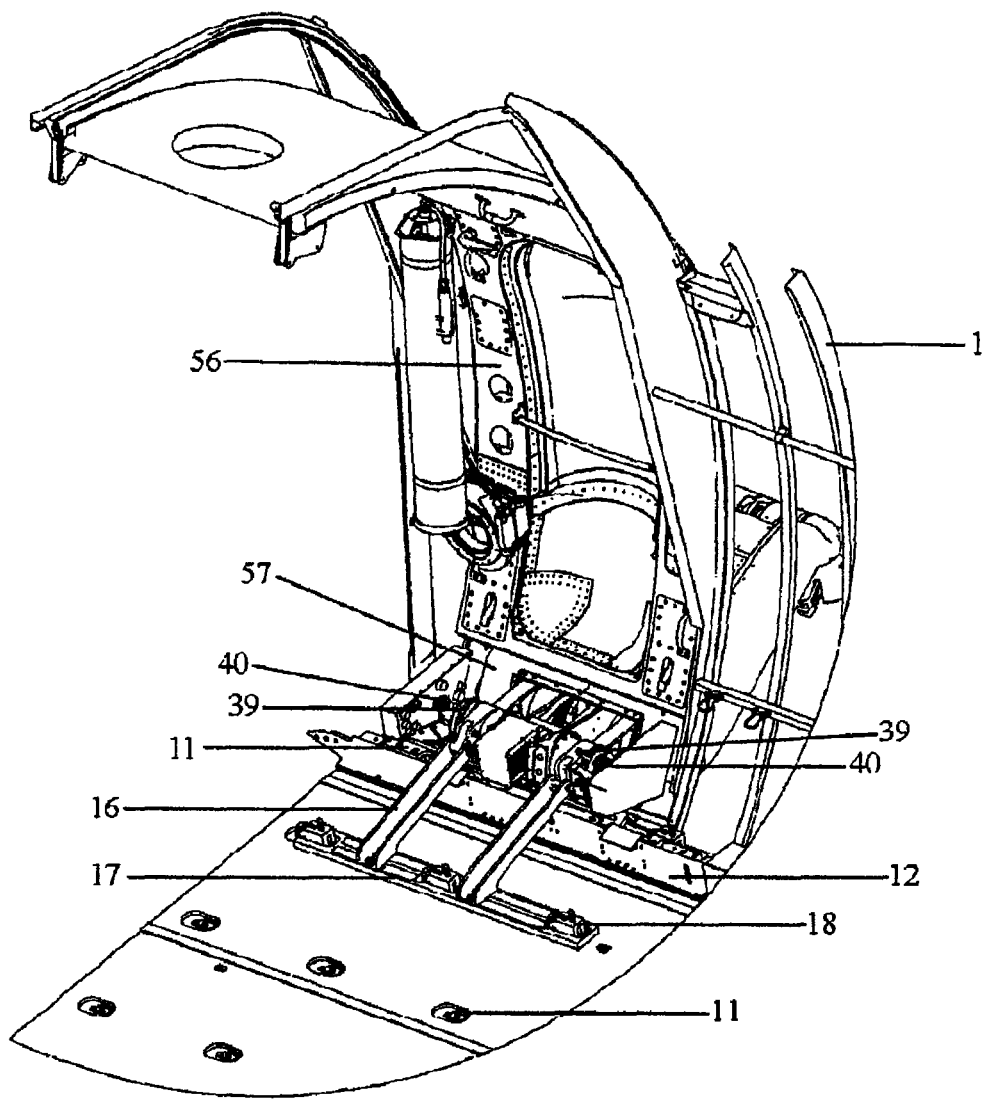
FIG. 3 depicts a strut deployed with ADS rail section and AMP attached to same with both the lower close-out panel and upper door plug panel installed with manual retract sockets, disengaging clutch handles, dual electric drives, and control box.
Figure 6:
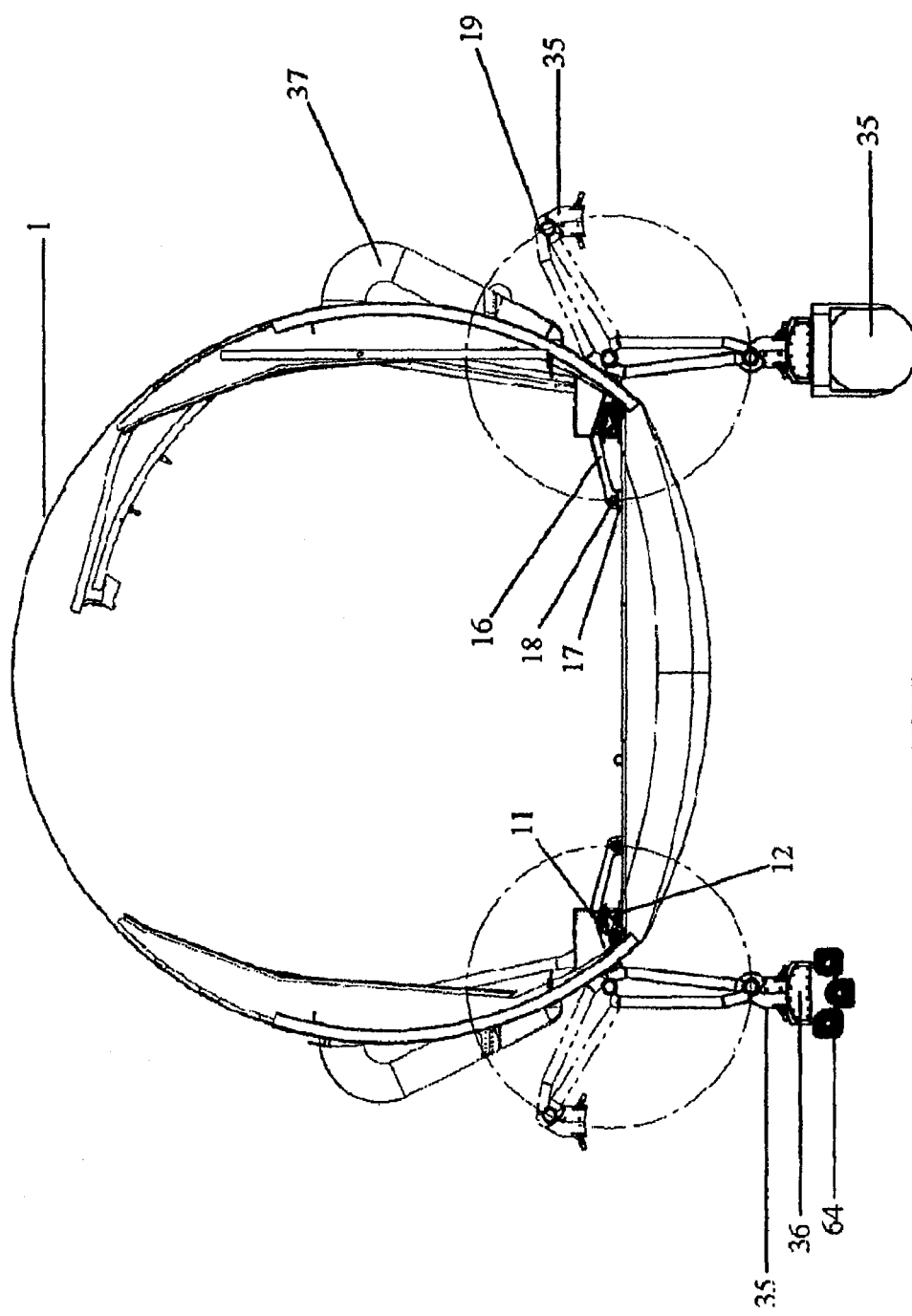
FIG. 6 depicts an external perspective of the subject apparatus with two struts deployed simultaneously outboard of the aircraft fully extended, wherein one is equipped with a triple ejector rack loaded with three dispensable stores, and the other with an integrated EO/IR surveillance and targeting sensor turret. In both instances the complete range of motion arcs of the struts into the aircraft is also depicted illustrating the ability of the strut gearing and drive mechanisms to accommodate in flight retraction and extension for sensor change and stores re-loading.
Figure 10:
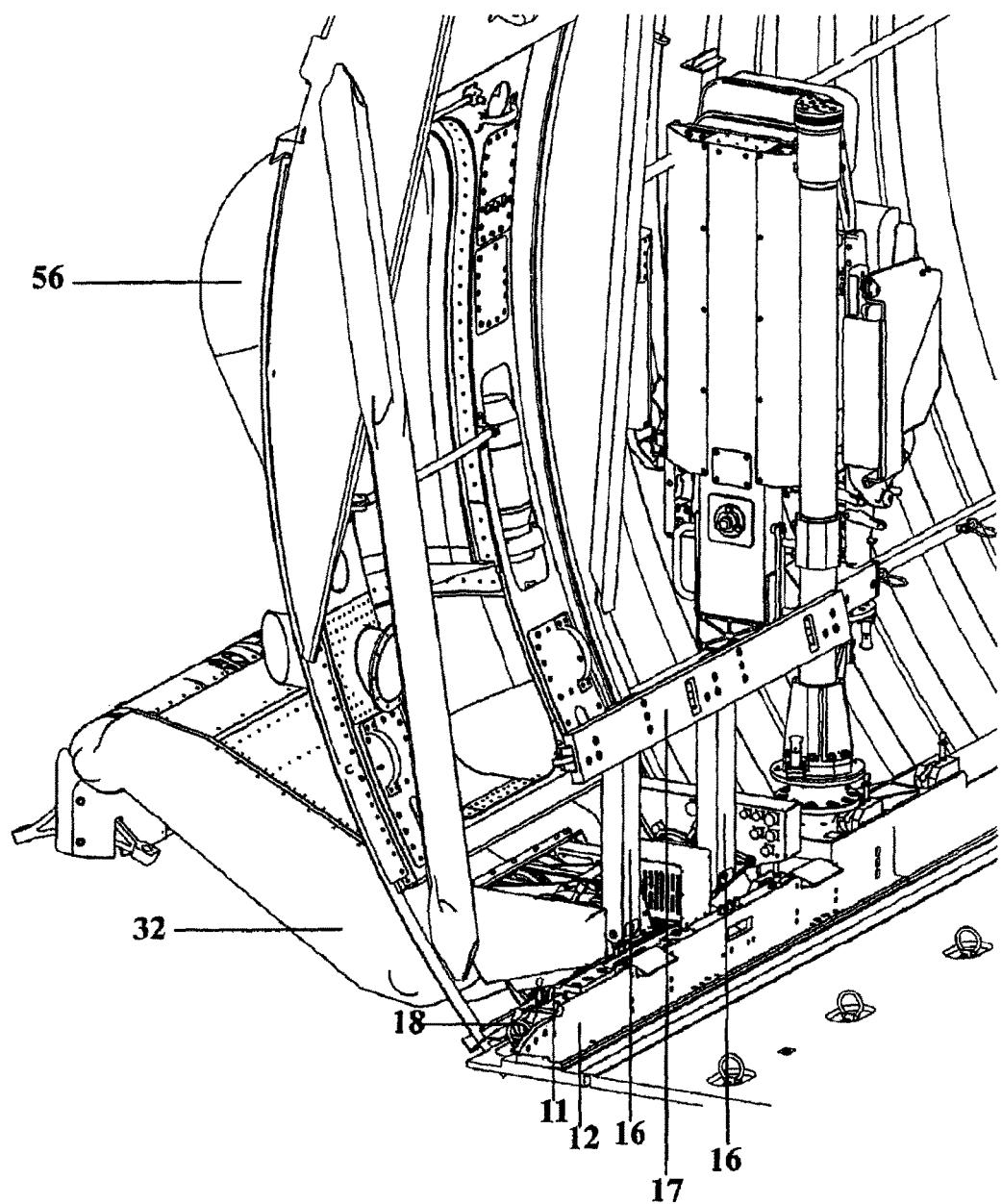
FIG. 10 depicts the installation of a completed mission assembly with the strut retracted, observer chair stowed, and the load transfer braces in the up and retracted position so as to enable use of the ADS rails for air drop.

As depicted in FIGS. 3, 4, and 6, the embodiment of the present invention can also accommodate a rapidly removable pair of load transfer braces (LTB) 16 which can be hinged to the strut motor housing casing 27. Such a configuration effectively increases the externally suspended payload weight of the sensor pods or other externally hung stores. As shown in FIG. 10, if during the process of accommodating the increased payload the host aircraft must engage in air drop activities, the transfer load transfer braces (LTB) 16 hinged to a load transfer brace flange 15 can be retracted to their vertical positions, the pallets jettisoned, and the load transfer brace (LTB) 16 and floor load plate (FLP) 17 can be re-secured to the host aircraft cargo floor cargo tie down "D" rings 14 using adjustable cam locks 18. It is noted although not depicted that a greater number and length of load transfer braces (LTB) 16 and floor load plates (FLP) 17 could be added to accommodate an increased number of cargo tie down "D" rings, thereby providing a greater load dispersal area and corresponding increase in payload capability.

METHOD OF OPERATION

The preferred methodology as described herein for installing and employing the apparatus of the current invention typically involves two crew members familiar with airframe maintenance. The entire assembly can be man portable and can consist of a strut transport & alignment case 20, a payload case of suitable size and typically not exceeding 400 pounds, and typical single sensor pod/ordinance loader to position and elevate the sensor pod once the strut is installed.

The installation sequence can begin with the attachment of the strut transport & alignment case 20 to the floor of a host aircraft, for example a Lockheed-Martin C-130 aircraft 1, wherein the paratroop door would be opened and secured. The adaptive mounting plate (AMP) 11 could be secured to the ADS rail 12, and the rotationally-actuated strut 32, assembly secured to the AMP motor housing flange 26, by means of the motor housing bolt assembly 25. At this point the rotationally-actuated strut 32, would be rotated about the shoulder armature assembly 33, through the open doorway, and the single piece door plug 55, or alternatively the combined door plug upper panel 56, and door plug lower panel 57, installed to seal the doorway.

The load transfer braces (LTB) 16 and floor load plate (FLP) 17 assembly could then be lowered into position and connected to multiple cargo tie-down "D" ring 14, means by using several adjustable cam locks 18 secured in place by multiple adjustment bolts 22. Finally, the entire shoulder armature assembly 33, twin drive motors 38, and associated electrical and mechanical gearing could be covered by a removable AMP armor housing 19. The entire system could be checked using a localized controller to verify indicator light positions against the actual position of the strut. The strut emergency manual retract could also be tested. The door assembly could then be tested for functionality and non-interference with the rotationally-actuated strut 32 assembly.

The rotationally-actuated strut 32 assembly could be secured in the up or retracted position external to the aircraft in readiness for attachment of various payloads to the NATO ordinance rack 35 or triple ejector rack 36. A typical bomb/ordinance loader carrying any number of payloads including a single sensor 60, and RF antenna pod 61, and EWSP missile countermeasures pod 62, jettisonable stores 64, or other sensor pod could be positioned below the NATO ordinance rack 35 or triple ejector rack 36 and the mission components physically attached to the rotationally-actuated strut 32 assembly using procedures and methods common within the field of ordinance loading. The loader could then be removed along with the strut transport and alignment case 20, and the various power, data, pod, and control system cables connected for diagnostics testing and ultimate mission usage.

While preferred embodiments have been shown and described, various substitutions and modifications may be made without departing from the spirit and scope of the invention. Accordingly it is to be understood that the present invention has been described by way of illustration and not limitation.

What is claimed is:

1. A mission payload mounting apparatus comprising:
 a pressurized door plug assembly on a side of an aircraft fuselage; and
 a strut having a first end and a second end, wherein:
  the strut extends from an interior of the aircraft fuselage through the pressurized door plug assembly to an exterior of the aircraft fuselage;
  the strut is capable of being rotationally actuated about an axis exterior to the aircraft fuselage;
  the first end of the strut is connected to the interior of the aircraft fuselage; and
  one or more payloads are attached to the strut between the axis and the second end.

2. The apparatus of claim 1, wherein the first end of the strut is coupled to an adaptive mounting system (AMS) plate adapted to attach to one or more Air Deployment System (ADS) rails of the aircraft.

3. The apparatus of claim 2, wherein the AMS plate is adapted to attach to the one or more ADS rails via one or more restraint and bolt devices.

4. The apparatus of claim 2, wherein the first end of the strut is coupled to the AMS plate via:
 coupling a bolt assembly to the strut;
 coupling a flange to the AMS plate; and
 coupling the bolt assembly to the flange.

5. The apparatus of claim 2, further comprising one or more removable load transfer braces (LTBs) which interface to the AMS plate and extend inboard from the AMS plate to interface to a floor of the aircraft.

6. The apparatus of claim 5, wherein:
 the one or more LTBs are hinged to the AMS plate via one or more flanges; and
 the one or more LTBs can be rotated to a vertical position via the one or more flanges upon disconnection of the inboard interface to the floor of the aircraft.

7. The apparatus of claim 1, wherein the strut is capable of being rotationally actuated.

8. The apparatus of claim 7, wherein the strut is capable of being rotationally actuated by:
 one or more electric drive motors; or
 one or more hand wrenches.

9. The apparatus of claim 7, further comprising a shoulder armature assembly coupled to the first end of the strut, wherein the strut is coupled to the AMS plate via the shoulder armature assembly.

10. The apparatus of claim 9, further comprising a wrist armature assembly, wherein the wrist armature assembly is coupled to the second end of the strut.

11. The apparatus of claim 10, wherein the wrist armature assembly is mechanically connected to the shoulder armature assembly.

12. The apparatus of claim 11, wherein the wrist armature assembly is further capable of being maintained in a vertical position while the strut is rotationally actuated through a range of angles.

13. The apparatus of claim 12, wherein the strut is capable of being articulated to a position where the second end of the strut is below a lower periphery of the aircraft.

14. The apparatus of claim 12, wherein the rotational actuation of the strut is controlled via a handheld device located adjacent to the pressurized door plug assembly.

15. The apparatus of claim 12, wherein the rotational actuation of the strut is controlled via an operator control mechanism built into the pressurized door plug assembly.

16. The apparatus of claim 1, wherein the one or more payloads comprise an ordinance rack.

17. The apparatus of claim 16, wherein the ordinance rack further comprises one or more adjustable sway braces adapted for one or more payloads attached to the ordinance rack.

18. The apparatus of claim 1, wherein the pressurized door plug assembly comprises:
 a single piece door plug; or
 a combined door plug upper panel and a door plug lower panel.

19. A method of installing a mission payload mounting apparatus to an aircraft comprising:
 installing a pressurized door plug assembly on a side of an aircraft fuselage; and
 connecting a first end of a strut to an interior of the aircraft fuselage, wherein:
  the strut extends from the interior of the aircraft fuselage to an exterior of the aircraft fuselage through the pressurized door plug assembly;
  the strut is capable of being rotationally actuated about an axis exterior to the aircraft fuselage; and
  one or more payloads are attached to the strut between the axis and a second end of the strut exterior of the aircraft fuselage.

20. The method of claim 19, wherein the first end of the strut is coupled to an adaptive mounting system (AMS) plate adapted to attach to one or more Air Deployment System (ADS) rails of the aircraft.

* * * * *